United States Patent
Ichieda

(10) Patent No.: US 8,944,607 B2
(45) Date of Patent: Feb. 3, 2015

(54) PROJECTOR AND PROJECTION CONDITION ADJUSTMENT METHOD

(75) Inventor: Hiroyuki Ichieda, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 503 days.

(21) Appl. No.: 13/114,393

(22) Filed: May 24, 2011

(65) Prior Publication Data
US 2011/0292218 A1    Dec. 1, 2011

(30) Foreign Application Priority Data

May 25, 2010 (JP) ................................. 2010-119765

(51) Int. Cl.
*G03B 21/14*    (2006.01)
*H04N 9/31*    (2006.01)

(52) U.S. Cl.
CPC ........... *H04N 9/3197* (2013.01); *H04N 9/3185* (2013.01); *H04N 9/3194* (2013.01)
USPC ......................................................... 353/69

(58) Field of Classification Search
CPC .................................................. H04N 9/3185
USPC ................ 353/69, 70; 348/745, 177; 345/178
See application file for complete search history.

(56) References Cited

U.S. PATENT DOCUMENTS

| 2006/0038962 | A1 | 2/2006 | Matsumoto et al. | |
|---|---|---|---|---|
| 2008/0259289 | A1* | 10/2008 | Nozaki et al. | 353/70 |
| 2008/0284987 | A1* | 11/2008 | Yonezawa | 353/70 |
| 2010/0315601 | A1* | 12/2010 | Furui | 353/70 |

FOREIGN PATENT DOCUMENTS

| JP | 2005-257765 A | | 9/2005 |
|---|---|---|---|
| JP | 2006-060447 A | | 3/2006 |
| JP | 2007-013810 A | | 1/2007 |
| JP | 2008-109337 A | | 5/2008 |
| JP | 2008109337 A | * | 5/2008 |
| JP | 2008-219190 A | | 9/2008 |
| JP | 2010-288063 A | | 12/2010 |

* cited by examiner

*Primary Examiner* — Thanh Luu
*Assistant Examiner* — Danell L Owens
(74) *Attorney, Agent, or Firm* — ALG Intellectual Property, LLC

(57) ABSTRACT

A projector includes an image projection section adapted to project an image, an imaging section adapted to shoot the image projected, an input image generation section adapted to generate an input image based on image information input to the projector, a first calibration image generation section adapted to generate a first calibration image having a first pattern including a plurality of detection areas superimposed on the input image to thereby make the image projection section project the first calibration image, and a projection condition adjustment section adapted to adjust a projection condition of the image based on the first calibration image shot by the imaging section. The first pattern has a first portion, and a second portion having a grayscale different from a grayscale of the first portion and rimming the first portion.

8 Claims, 13 Drawing Sheets

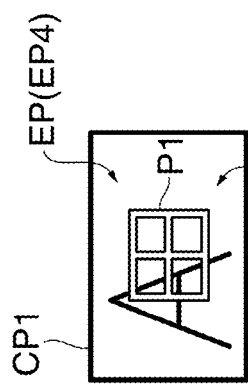
FIG. 10A
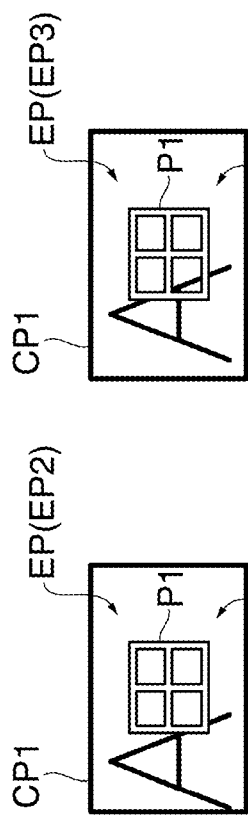
FIG. 10B
FIG. 10C
FIG. 10D
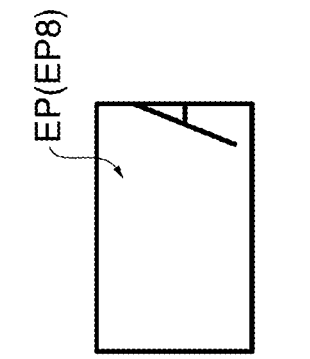
FIG. 10E
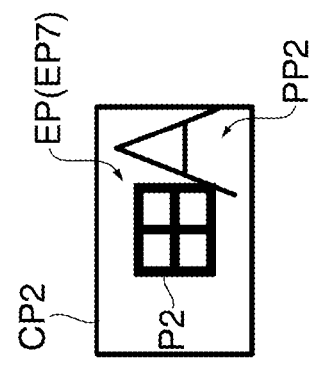
FIG. 10F
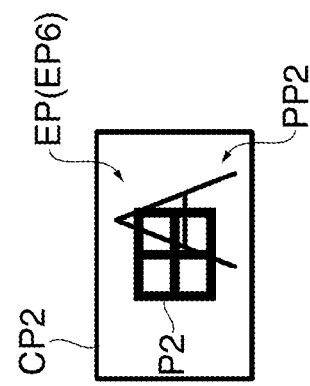
FIG. 10G
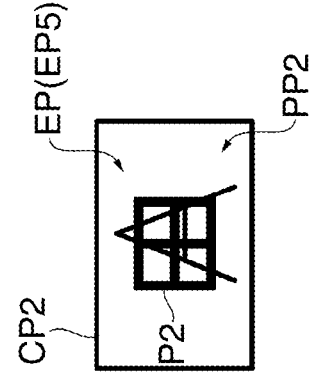
FIG. 10H

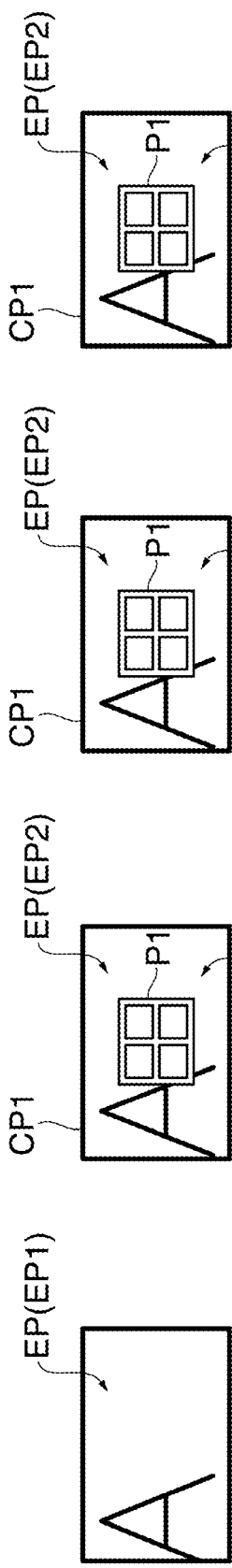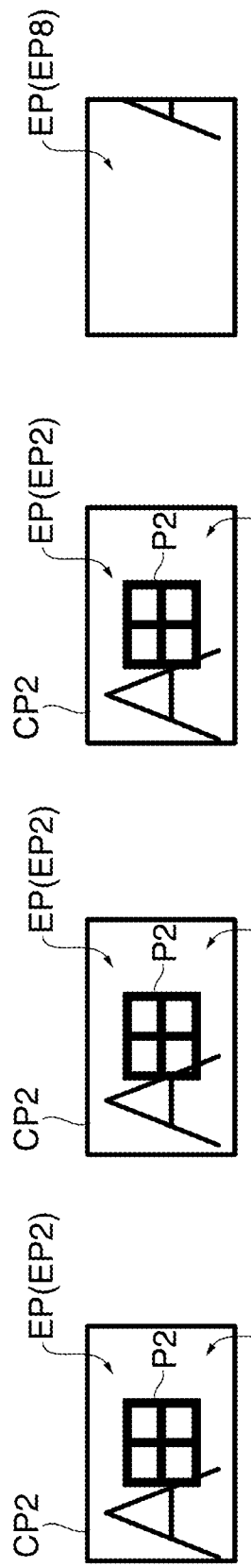

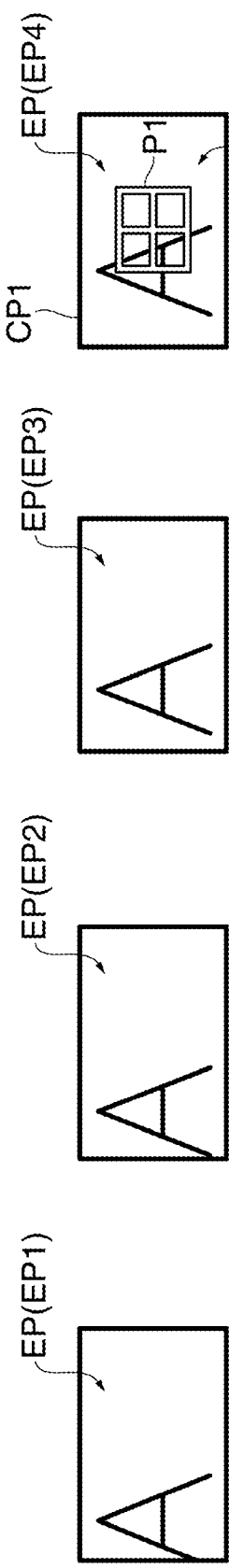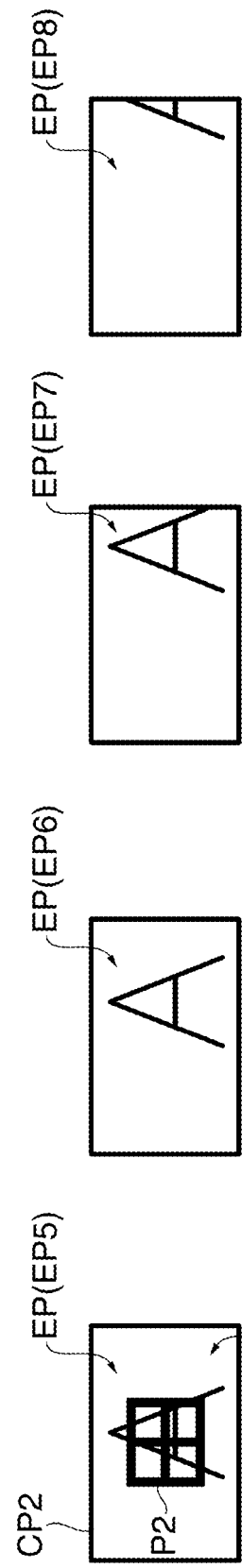

PROJECTOR AND PROJECTION CONDITION ADJUSTMENT METHOD

The entire disclosure of Japanese Patent Application No. 2010-119765, filed May 25, 2010 is expressly incorporated by reference herein.

BACKGROUND

1. Technical Field

The present invention relates to a projector, and a projection condition adjustment method performed using a projector.

2. Related Art

In the past, there has been known a projector, which modulates the light beam emitted from a light source to thereby form an image, and project the image on a projection target plane such as a screen in an enlarged manner. When projecting the image using such a projector, the image projected on the projection target plane might be distorted in some cases depending on the positional relationship between the projection target plane and the projector. To cope with such a problem, there has been known a projector, which calculates the relative angle and distance with respect to the projection target plane to thereby perform the correction of the keystone distortion (the keystone correction) of the image (see, e.g., JP-A-2006-60447 (Patent Document 1)).

In the projector described in Patent Document 1 described above, a grid-like pattern image having white areas and black areas alternately arranged in a 3×3 matrix is displayed, and then the pattern image is shot by an imaging section. Then, the boundary (particularly the boundary at the central portion) between the white areas and the black areas is detected from the shot image, then the position of the projection area of the image is calculated, and then the keystone distortion of the image is corrected based thereon. It should be noted that in the present projector, the focus adjustment of the projection image is also performed in accordance with the position of the projection area thus calculated.

Here, the keystone correction and the focus adjustment by the projector is performed after the projector is started up and then changed to the state in which the image projection is possible. Therefore, there arises a problem that when switching the state from display of the input image input to the projector to the display of the pattern image described above, rapid change in brightness is caused in the projection area, and therefore, imaging by the imaging section is not stabilized. Therefore, there arises a problem that it takes long time until the imaging by the imaging section is stabilized.

In contrast, it is possible to generate a calibration image obtained by superimposing the pattern image described above on an input image and then display the calibration image, and then detect the position of the projection image based on the shot image obtained by shooting the calibration image.

However, in such a case, there arises the possibility that the detection of the pattern becomes difficult under the influence of the grayscale on the periphery of the pattern depending on the input image, and the appropriate adjustment of the projection condition is hindered.

SUMMARY

An advantage of some aspects of the invention is to provide a projector and a method of adjusting the projection condition capable of appropriately adjusting the projection condition of an image.

An aspect of the invention is directed to a projector adapted to project an image, including an image projection section adapted to project the image, an imaging section adapted to shoot the image projected, an input image generation section adapted to generate an input image based on image information input to the projector, a first calibration image generation section adapted to generate a first calibration image having a first pattern including a plurality of detection areas superimposed on the input image to thereby make the image projection section project the first calibration image, and a projection condition adjustment section adapted to adjust a projection condition of the image based on the detection areas detected from the first calibration image shot by the imaging section.

The first pattern has a first portion, and a second portion having a grayscale different from a grayscale of the first portion and rimming the first portion.

According to one aspect of the invention, since the first pattern included in the first calibration image generated by the first calibration image generation section includes the second portion having the grayscale different from that of the first portion and rimming the first portion, it is possible to make it easy to detect the first pattern (in particular the first portion) included in the first calibration image thus shot from the difference in grayscale between the first portion and the second portion in the first pattern. Therefore, the detection accuracy of the shot image of the detection areas included in the first pattern can be improved, and the adjustment of the projection condition of the image by the projection condition adjustment section can be performed with accuracy.

Further, since it becomes easy for the user to recognize the first pattern thus projected, it is possible to make it easy for the user to figure out that the adjustment of the projection condition is in process.

Further, according to one aspect of the invention, since the difference image obtaining section obtains the difference image between the shot image of the first calibration image described above and the shot image of the second calibration image including the second pattern, the image component derived from the input image can be eliminated from the difference image for detecting the detection areas. Since the second pattern is entirely provided with the same grayscale as the second portion in the first pattern, it is possible to make the first portion in the first pattern prominent in the difference image. Therefore, the detection areas included in the first pattern can be made easy to detect, and thus making it possible to further improve the detection accuracy of the detection areas.

Further, according to one aspect of the invention, by detecting the position at which the grayscale is the highest or the lowest in the detection area, the center position of the detection area can be detected. Therefore, even in the case in which the detection area is relatively large, the center position of the detection area can be detected with accuracy, and therefore, the adjustment of the projection condition of the image can be performed with higher accuracy.

Further, according to one aspect of the invention, since each of the detection areas is provided with such a grayscale variation, even in the case in which the noise derived from the input image is included in the calibration images shot by the imaging section, it is possible to separate the noise using the grayscale variation as an index.

Further, according to one aspect of the invention, since the grayscale set to the first portion in the first pattern is higher than the grayscale set to the second portion, the grayscale rises (the brightness increases) as the distance from the center thereof decreases in the detection area included in the first portion. According to this configuration, even in the case in which the distance between the projector and the projection target surface is large, and the sensitivity of the imaging section is degraded, it is possible to make it easy for the imaging section to obtain the grayscale variation in the detection area. Therefore, it is possible to make it easy to perform detection of the center position of the detection area from the shot image.

Further, according to one aspect of the invention, since it can be made easy to detect the position of the detection area as described above, it is possible for the keystone correction section to correct the keystone distortion of the image to be projected with accuracy. Therefore, the projection condition of the image can appropriately be adjusted, and the input image can appropriately be displayed.

Further, according to one aspect of the invention, since it can be made easy to detect the position of the detection area as described above, it is possible for the focus adjustment section to correct the focus error of the image to be projected with accuracy. Therefore, the projection condition of the image can appropriately be adjusted, and the input image can appropriately be displayed.

Another aspect of the invention is directed to a projection condition adjustment method performed using a projector adapted to project an image, and adapted to adjust a projection condition of the image, including: generating an input image based on image information input to the projector, generating a calibration image having a first pattern, which has a first portion and a second portion having a grayscale different from that of the first portion and rimming the first portion, and includes a plurality of detection areas in the first portion, superimposed on the input image, projecting the calibration image, shooting the calibration image projected, and adjusting the projection condition of the image based on the detection areas to be detected from the calibration image shot.

By performing the projection condition adjustment method according to this aspect of the invention using the projector, the same advantages as in the projector described above can be obtained.

Still another aspect of the invention is directed to a projection condition adjustment program executed by a projector adapted to project an image, and adapted to adjust a projection condition of the image, the program making the projector perform the steps of generating in the projector an input image based on image information input to the projector, generating a calibration image having a first pattern, which has a first portion and a second portion having a grayscale different from that of the first portion and rimming the first portion, and includes a plurality of detection areas in the first portion, superimposed on the input image, projecting the calibration image, shooting the calibration image projected, and adjusting the projection condition of the image based on the detection areas to be detected from the calibration image shot.

By the projector executing such a projection condition adjustment program, the same advantages as in the projector described above can be obtained.

It should be noted that it is also possible to record the projection condition adjustment program on a recording medium in a computer readable manner. In this case, by the projector reading and then executing the projection condition adjustment program as needed, it becomes possible to obtain the same advantages as in the projector described above. Further, as the recording medium a magnetic tape such as a digital audio tape (DAT), a magnetic disc such as a flexible disc (FD), an optical disc such as a compact disc (CD) or a digital versatile disc (DVD), a magnet-optical disc, a hard disk drive, a semiconductor memory, and so on can be used. Further, by using these recording media, the projection condition adjustment program can be installed and then executed in the projector, and further, the distribution of the projection condition adjustment program can easily be performed.

BRIEF DESCRIPTION OF THE DRAWINGS

The invention will be described with reference to the accompanying drawings, wherein like numbers reference like elements.

FIGS. 10A through 10H are diagrams showing a calibration image in the embodiment.

FIGS. 11A through 11H are diagrams showing the calibration image in the embodiment.

FIGS. 12A through 12H are diagrams showing the calibration image in the embodiment.

DESCRIPTION OF AN EXEMPLARY EMBODIMENT

An embodiment of the invention will hereinafter be explained with reference to the accompanying drawings.
Configuration of Projector FIG. 1 is a block diagram showing a configuration and a function of a projector 1 according to the present embodiment.

The projector 1 according to the present embodiment is for modulating the light beam emitted from a light source to thereby from the image corresponding to the image information to be input, and then projecting the image on the projection target surface such as a screen in an enlarged manner. On this occasion, the projector 1 projects the calibration image including a plurality of detection areas on the projection plane, then detects the plurality of detection areas from the shot image obtained by shooting the calibration image thus projected, and then adjusts the projection condition of the image based on the detection result.

Figure 1:
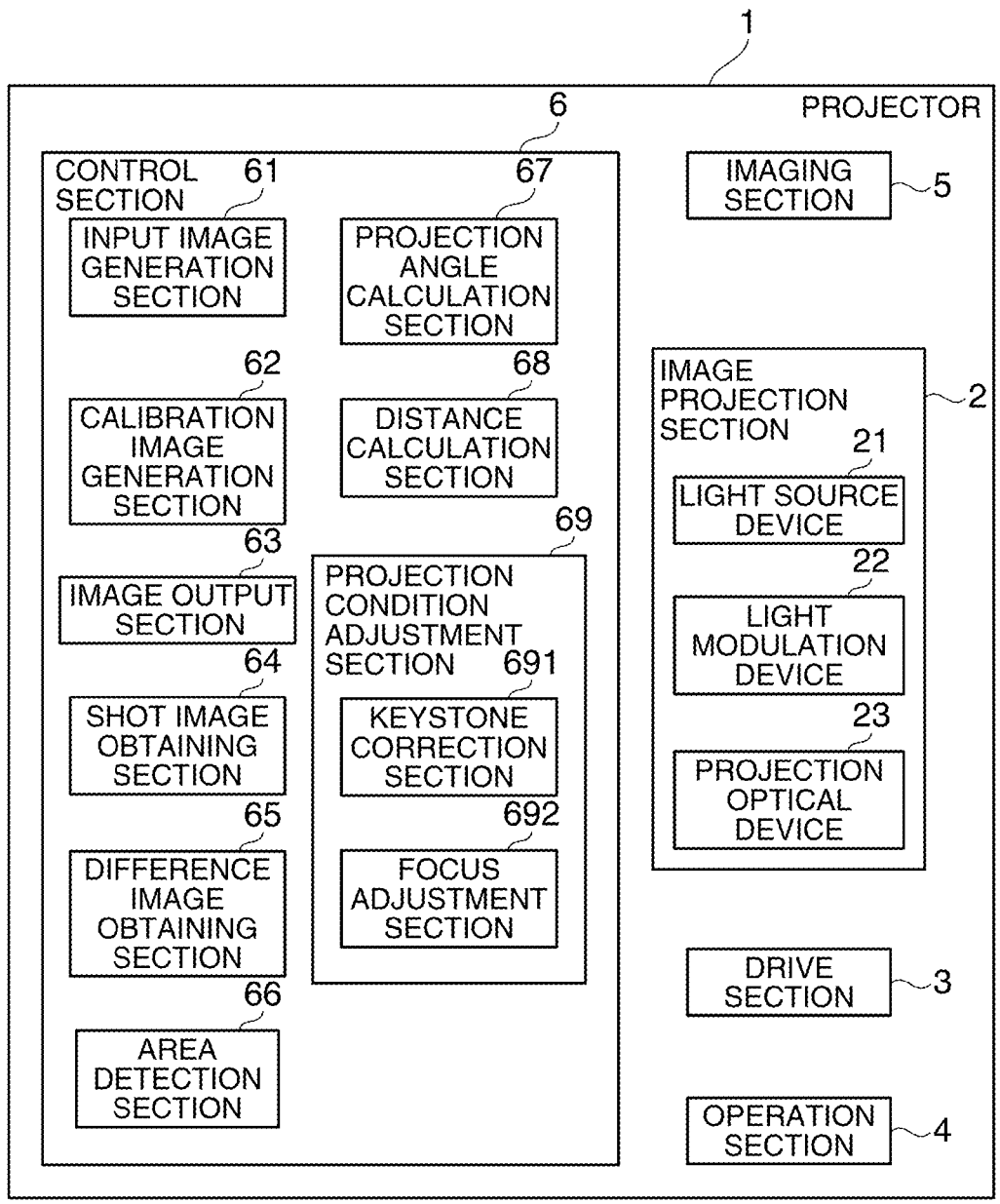
FIG. 1 is a block diagram showing a configuration of a projector according to an embodiment of the invention.

As shown in FIG. 1, such a projector 1 is provided with an image projection section 2, a drive section 3, an operation section 4, an imaging section 5, and a control section 6.
Configuration of Image Projection Section The image projection section 2 projects the image corresponding to the drive signal input from a control section 6 described later on the projection target surface in an enlarged manner. The image projection section 2 is provided with a light source device 21, a light modulation device 22, and a projection optical device 23, and is further provided with a plurality of optical elements (not shown).

The light source device 21 is provided with a solid-state light source such as a light source lamp such as a high-pressure mercury lamp and a reflector as a reflecting mirror, or a light emitting diode (LED), and irradiates the light modulation device 22 with the light beam.

Although the detailed illustration is omitted, the light modulation device 22 modulates the light beam emitted from the light source device 21 in accordance with the drive signal described above to thereby form the image corresponding to the drive signal. The light modulation device 22 has a configuration provided with a liquid crystal panel in the present embodiment, but is not limited thereto, and there can be adopted a configuration including a constituent other than the liquid crystal panel such as a device using a micromirror.

The projection optical device 23 projects the image formed by the light modulation device 22 on the projection target surface described above in an enlarged manner. The projection optical device 23 is configured as a combination lens provided with a body tube and a plurality of lenses housed in the body tube. The plurality of lenses includes, for example, a zoom lens and a focus lens, and the focus lens is moved back and forth by the drive section 3 along the axial direction of the body tube to thereby adjust the focus position of the image (the projection image) to be projected.

Configuration of Drive Section

The drive section 3 moves the focus lens described above back and forth under the control of the control section 6 to thereby perform the focus adjustment of the projection image. The drive section 3 is provided with a motor such as a stepping motor, and the drive of the drive section 3 is controlled based on the drive signal input from the control section 6.

Configuration of Operating Section

Although not shown in the drawings, the operation section 4 is composed of an operation panel provided to a remote controller and the projector 1, and has a plurality of keys. As such keys, the operation section 4 has a key for making the control section 6 perform a projection condition adjustment process described later in addition to a power key for making the power ON/OFF of the projector 1 be performed, a menu key for making the menu screen be displayed, direction keys for performing selection of the item included in the menu screen, and a determination key for performing determination of the item thus selected. Further, the operation section 4 transmits the operation signal corresponding to the key and input thereto to the control section 6.

Configuration of Imaging Section

The imaging section 5 shoots an imaging area including an area (hereinafter referred to as a "projection area" in some cases) in which the image is projected by the image projection section 2 under the control of the control section 6. Then, the imaging section 5 transmits the shot image obtained by shooting the imaging area to the control section 6. The imaging section 5 is disposed at a position where the imaging section 5 can shoot the projected image in the projector 1, and specifically in the vicinity of the projection optical device 23. It should be noted that although it is assumed that the imaging section 5 has a configuration having a complementary metal oxide semiconductor (CMOS) sensor in the present embodiment, the imaging section 5 is not limited thereto, but can have a configuration having a charge coupled device (CCD) image sensor or other types of detection devices.

Configuration of Control Section

The control section 6 is for controlling the overall operations of the projector 1. Although not shown in the drawings, the control section 6 is configured as a circuit board having circuit components such as a central processing unit (CPU), a random access memory (RAM), a read-only memory (ROM), and an image processor connected to each other via a bus. Further, the control section 6 realizes a predetermined function by the CPU processing various programs and data recorded in the ROM and so on.

The control section 6 has an input image generation section 61 for processing the image information (including image data and the image signal) input to the projector 1 to thereby generate the image (the input image) corresponding to the image information on a frame memory constituting the RAM described above. The input image generation section 61 is formed of the image processor described above.

Further, in the control section 6, the CPU processes the projection condition adjustment program recorded on the ROM to thereby realize various functions represented as a calibration image generation section 62, an image output section 63, a shot image obtaining section 64, a difference image obtaining section 65, an area detection section 66, a projection angle calculation section 67, a distance calculation section 68, and a projection condition adjustment section 69.

Figure 2:
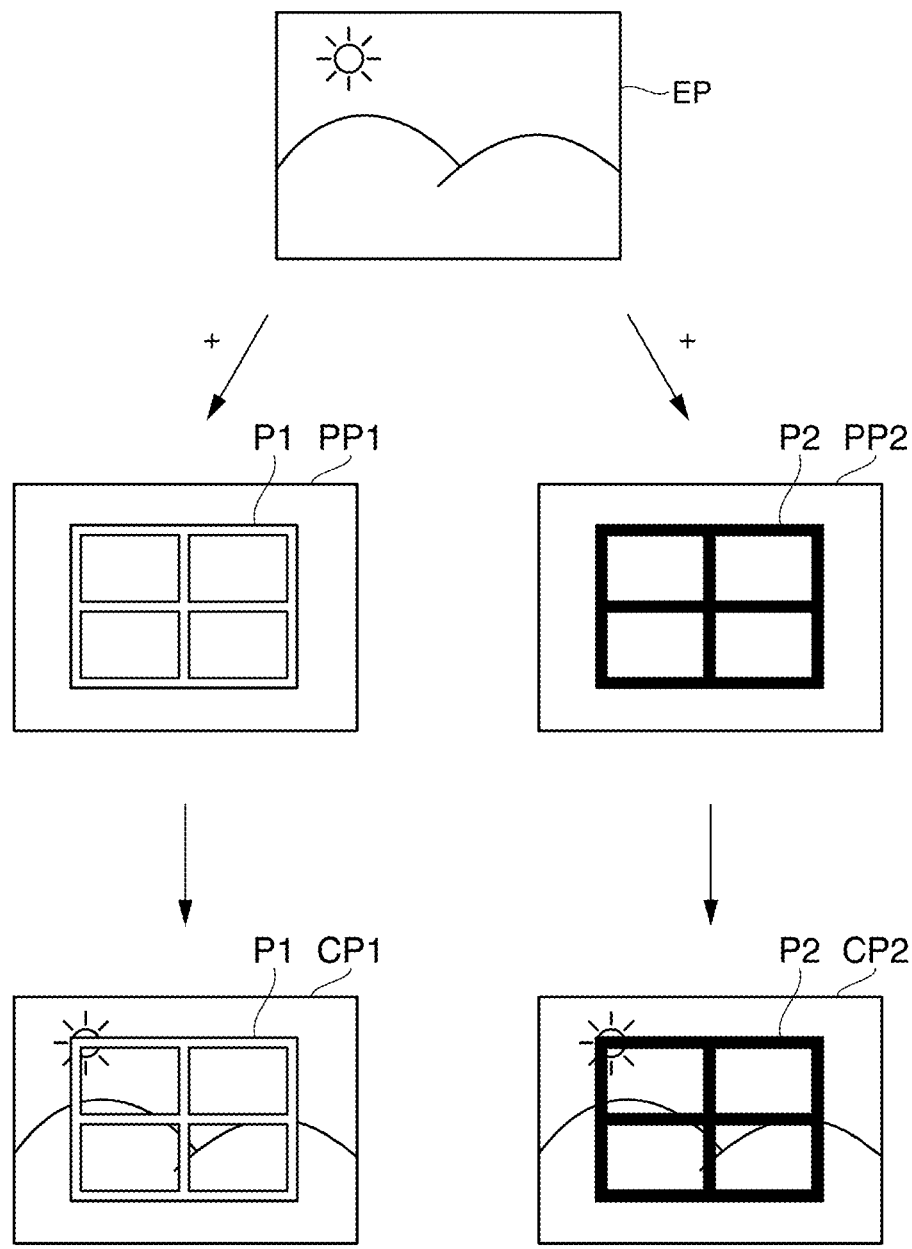
FIG. 2 is a diagram showing a generation process of a calibration image in the embodiment.

FIG. 2 is a diagram showing the process of generating the calibration images CP1, CP2.

The calibration image generation section 62 corresponds to the first calibration image generation section and a second calibration image generation section, and generates the first calibration image CP1 and the second calibration image CP2.

Specifically, the calibration image generation section 62 retrieves a first pattern image PP1 including a first pattern P1 for adjusting the projection condition from the ROM described above, and then superimposes the first pattern image PP1 on the input image EP generated on the frame memory to thereby generate the first calibration image CP1. Similarly, the calibration image generation section 62 retrieves a second pattern image PP2 including a second pattern P2 for adjusting the projection condition from the ROM, and then superimposes the second pattern image PP2 on the input image EP to thereby generate the second calibration image CP2.

In the first pattern image PP1 and the second pattern image PP2, the areas other than the regions where the first pattern P1 and the second pattern P2 are disposed are transmitting areas for transmitting the input images EP, and when the respective pattern images PP1, PP2 are superimposed, the image components derived from the input images EP are set respectively to the areas other than the patterns P1, P2.

Further, in the following explanation, it is assumed that the input images EP on which the respective pattern images PP1, PP2 are superimposed are the same still images.

Figure 3:
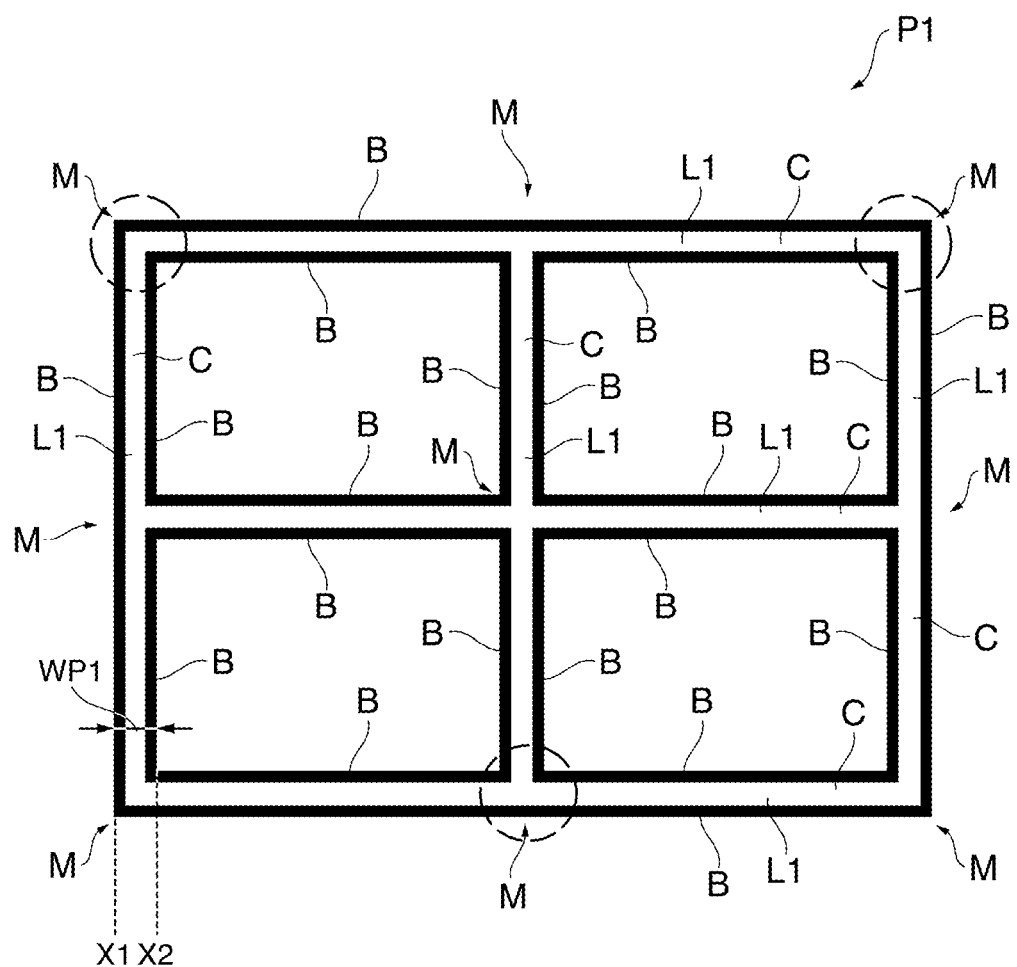
FIG. 3 is a diagram showing a first pattern in the embodiment.

FIG. 3 is a diagram showing the first pattern P1.

As shown in FIG. 3, the first pattern P1 is formed to have a grid-like shape composed of a plurality of straight lines L1 having a predetermined line width extending vertically and horizontally with predetermined intervals. In more detail, in the present embodiment, the first pattern P1 is composed of the straight lines L1 arranged in a 3×3 grid. In such a first pattern P1, detection areas M to be detected by the area detection section 66 described later are respectively located at the intersections between the straight lines L1 extending vertically and the straight lines L1 extending horizontally, for example. Therefore, it results that the first pattern P1 includes three or more detection areas M (e.g., the detection areas M surrounded by the dotted lines in FIG. 3) not located on the same straight line L1.

Figure 4:
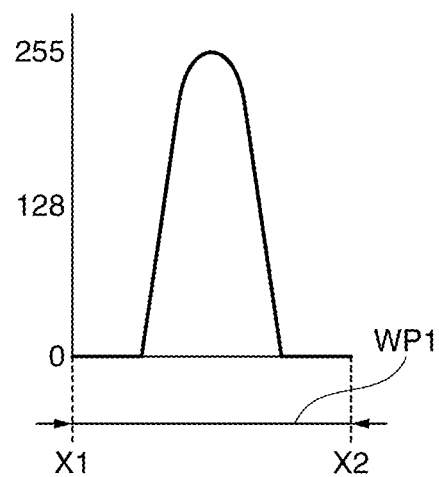
FIG. 4 is a diagram showing a grayscale variation in the detection area in the embodiment.

FIG. 4 is a diagram showing a grayscale variation in the detection area M in the first pattern P1.

In the outer and inner peripheral edges of such a first pattern P1, there are set rims B having a predetermined line width and having a grayscale different from the grayscale of the central portion of each of the straight lines L1 constituting the first pattern P1. In other words, each of the straight lines L1 has a central portion C corresponding to a first portion according to the invention, and the rims B as the second portion for riming the central portion C. Further, the central portion C and the rim B have the respective grayscales different from each other, wherein the grayscale (a first grayscale) of the central portion C is set higher than the grayscale (a second grayscale) of the rim B.

Specifically, the rim B is set to have the lowest grayscale of "0" as shown in FIG. 4.

On the other hand, on the central side of each of the straight lines L1, namely in the central portion C disposed between the rims B in each of the straight lines L1, there is set a grayscale (a bright grayscale) higher than the grayscale of the rim B. Specifically, as shown in FIG. 4, the grayscale of the central portion C is set so as to increase as the position moves from the central side edge of the rim B toward the center of the straight line L1. Further, at the center of the straight line L1, there is set the highest grayscale ("255" in the 256 levels of grayscale).

It should be noted that the dimension (the line width) of the straight line L1 in a direction (the width direction of the straight line L1) perpendicular to the extending direction of the straight line L1 is assumed to be the light width WP1. In other words, the dimension of the straight line L1 from one end X1 to the other end X2 in the width direction thereof is assumed to be the line width WP1.

Figure 5:
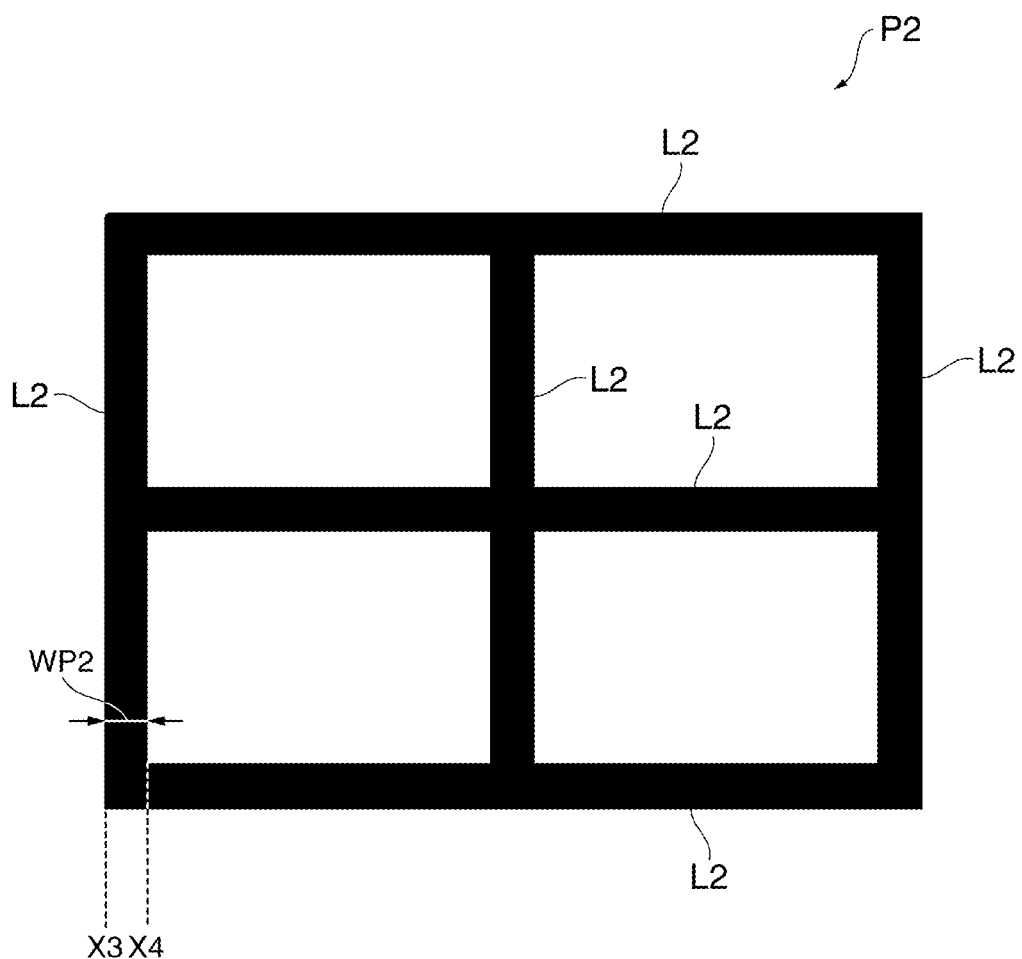
FIG. 5 is a diagram showing a second pattern in the embodiment.

FIG. 5 is a diagram showing the second pattern P2.

As shown in FIG. 5, the second pattern P2 has the same shape and the same dimension as those of the first pattern P1, and the position of the second pattern P2 in the second pattern image PP2 is the same as the position of the first pattern P1 in the first pattern image PP1.

Such a second pattern P2 is formed to have a grid-like shape composed of a plurality of straight lines L2 disposed with the same intervals as the intervals of the straight lines L1, and is formed to have a 3×3 grid-like shape in the present embodiment. The overall grayscale of each of the straight lines L2 is set to have the same grayscale as that of the rim B described above. In other words, in the present embodiment, the grayscale of the second pattern P2 is set to "0" as the lowest grayscale. Further, the line width WP2 (the dimension of the straight line L2 from one end X3 to the other end X4 thereof in the width direction, which is a direction perpendicular to the extending direction thereof, in FIG. 5) of the straight line L2 constituting the second pattern P2 is set to be the same as the line width WP1 of the straight line L1 described above.

Returning to FIG. 1, the image output section 63 outputs the drive signal corresponding to the image generated on the frame memory described above to the image projection section 2 described above. Therefore, in the case in which the input image is generated by the input image generation section 61, the image output section 63 outputs the drive signal corresponding to the input image. Further, in the case in which the first calibration image CP1 or the second calibration image CP2 (see FIG. 2) is generated by the calibration image generation section 62, the image output section 63 outputs the drive signal corresponding to the image. Thus, the image projection section 2 projects either one of the input image, the first calibration image CP1, and the second calibration image CP2 onto the projection target surface.

Figure 6:
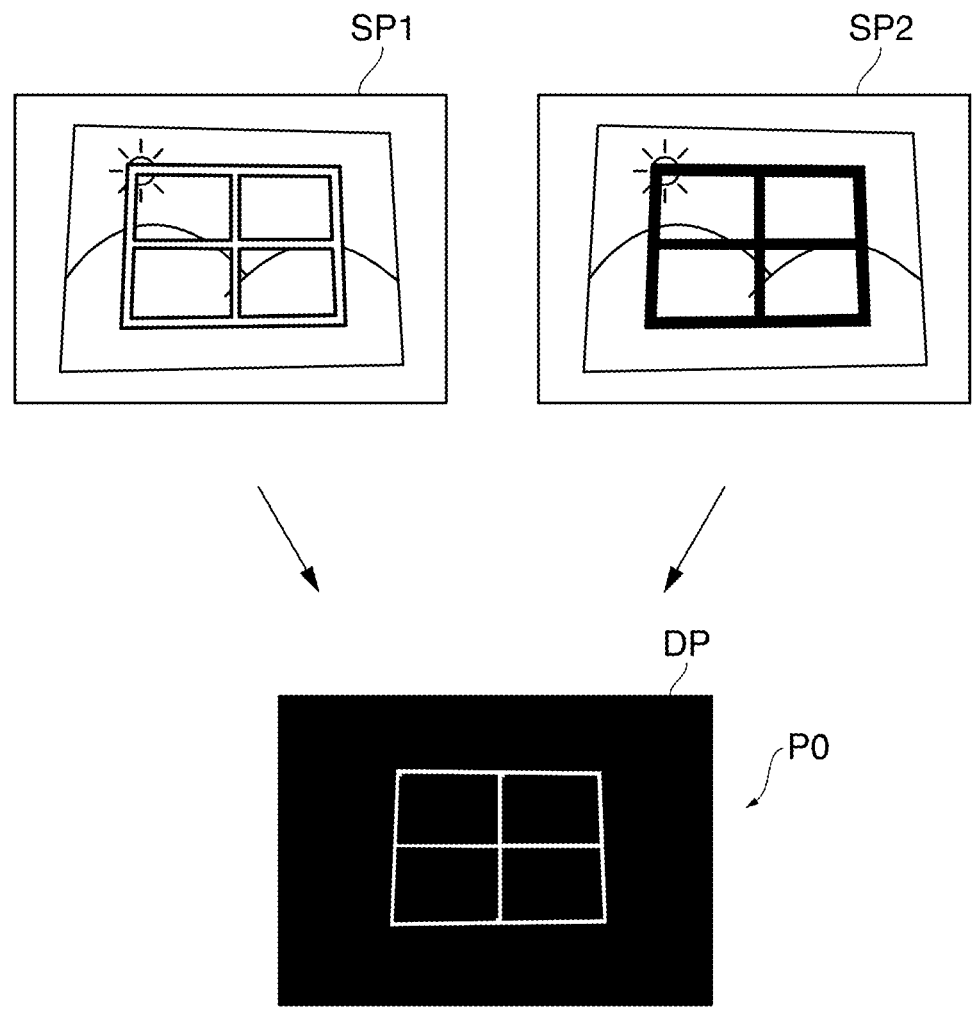
FIG. 6 is a diagram showing an obtaining process of a difference image in the embodiment.

FIG. 6 is a diagram showing the process of obtaining a difference image DP from the shot images SP1, SP2.

The shot image obtaining section 64 functions when the calibration images CP1, CP2 are projected. The shot image obtaining section 64 controls the operation of the imaging section 5 to thereby obtain the shot images SP1, SP2 (see the upper column of FIG. 6) of the respective calibration images CP1, CP2 shot by the imaging section 5. Then, the shot image obtaining section 64 stores the image data of the shot images SP1, SP2 thus obtained into a memory not shown.

The difference image obtaining section 65 corresponds to a difference image obtaining section of the invention. The difference image obtaining section 65 subtracts the grayscale of the pixel in the shot image SP2 thus obtained from the grayscale of the pixel at the same position in the shot image SP1 thus obtained pixel by pixel to thereby obtain the difference image DP (see the lower column of FIG. 6) corresponding to the difference between the shot images SP1, SP2. Thus, it results that the difference image DP includes the pattern P0 obtained by eliminating the rim B in the first pattern P1, namely the pattern P0 corresponding to the central portion C in the first pattern P1. Therefore, the pattern P1 includes the central portion C of each of the detection areas M.

Figure 7A:
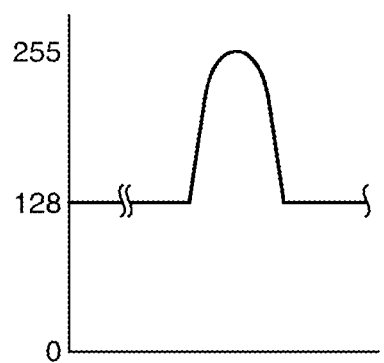
FIGS. 7A through 7C are diagrams showing comparative example with respect to the embodiment.
Figure 7B:
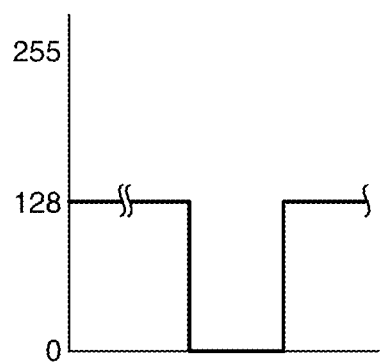
Figure 7C:
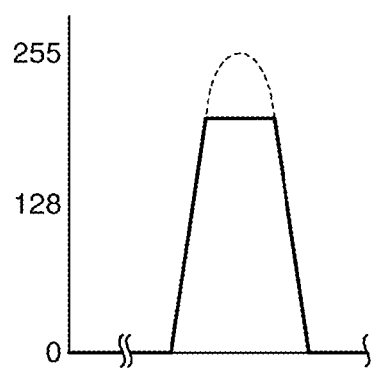

FIGS. 7A through 7C are diagrams showing comparative example with respect to the present embodiment. Specifically, FIG. 7A is a diagram showing the grayscale in the vicinity of the detection area in the first pattern without the rim, and FIG. 7B is a diagram showing the grayscale at the position corresponding to the detection area in the second pattern. Further, FIG. 7C is a diagram showing the grayscale in the vicinity of the detection area included in the difference image obtained from the shot images, which are obtained by shooting the first calibration image (hereinafter referred to as a "comparative first image") including the first pattern without the rim (i.e., the pattern P0 corresponding to the central portion C) and the second calibration image (hereinafter referred to as a "comparative second image") having the second pattern corresponding to the first pattern.

Here, the grayscale of the detection area in the pattern included in the difference image between the shot image of the comparative first image and the shot image of the comparative second image including the second pattern composed of the straight lines having the same line width as the line width of the straight lines constituting the first pattern and having different grayscales from the grayscales of those straight lines.

If the input image EP is a halftone image (the image having the grayscale of "128"), the grayscale in the vicinity of the detection area in the comparative first image increases as the distance from the center of the detection area decreases, and the grayscale reaches "255" at the center thereof as shown in FIG. 7A.

In contrast, in the grayscale in the vicinity of the detection area described above in the comparative second image including the second pattern formed to have the same line width as that of the first pattern and having the grayscale of "0," the grayscale becomes "0" at the position corresponding to the detection area as shown in FIG. 7B if the input image EP is the halftone image similarly to the case described above.

Further, in the difference image between the shot image of the comparative first image and the shot image of the comparative second image, the grayscale at the position corresponding to the detection area in the first pattern is maintained while the grayscale derived from the input image EP is decreased to approximately "0." However, the difference image is the difference between the shot images of the comparative first image and the comparative second image, and the grayscale at the position corresponding to the detection area in the difference image is affected by the image component of the input image EP in the vicinity of the detection area in the shooting process. Therefore, as shown in FIG. 7C, the grayscale of the area corresponding to the detection area in the difference image is lowered. Therefore, even if the grayscale at the center of the detection area is set to the highest, the detection accuracy of the center position of the detection area is problematically degraded.

Figure 8A:
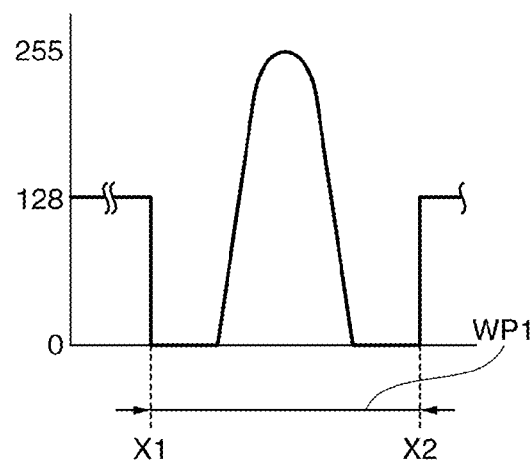
FIGS. 8A through 8C are diagrams showing the grayscale in the vicinity of the detection area in the difference image in the embodiment.
Figure 8B:
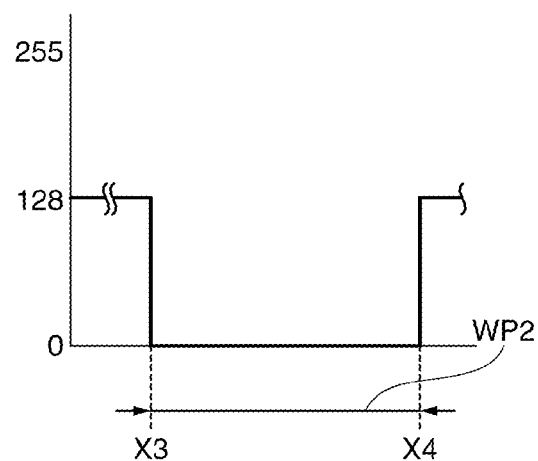
Figure 8C:
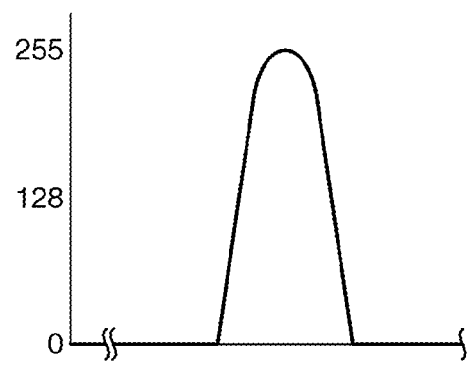

FIGS. 8A through 8C are diagrams showing the grayscale in the vicinity of the detection area M in the difference image DP. Specifically, FIG. 8A is a diagram showing the grayscale in the vicinity of the detection area M in the first pattern P1, and FIG. 8B is a diagram showing the grayscale at the position corresponding to the detection area M in the second pattern P2. Further, FIG. 8C is a diagram showing the grayscale in the vicinity of the detection area M in the difference image DP.

As shown in FIG. 8A, in the vicinity of the detection area M in the first pattern P1, the grayscale of the area corresponding to the rim B decreases from the grayscale of the input image EP as the halftone to "0," and the grayscale of the central portion C disposed between the rims B increases as the distance from the center of the central portion C decreases.

Further, as shown in FIG. 8B, the grayscale at the position corresponding to the detection area M in the second pattern P2 decreases from the grayscale of the input image EP as the halftone to "0."

Further, similarly to the case described above, in the vicinity of the detection area M of the pattern P0 included in the difference image DP, the grayscale in the detection area M in the central portion C is maintained while the grayscale derived from the input image EP is decreased to "0." On this occasion, it becomes difficult for the image component derived from the input image EP to affect the detection area M having high grayscale to the extent as much as the line width of the rim B. Therefore, as shown in FIG. 8C, since the grayscale of the detection area M of the central portion C in the difference image DP becomes hard to decrease, it becomes easy to detect the center position of the detection area M, and thus the detection accuracy of the center position is improved.

The area detection section 66 corresponds to an area detection section of the invention, and detects the center position of the detection area M from the pattern P0 included in the difference image DP for each of the detection areas M. On this occasion, for example, the area detection section 66 firstly binarizes the grayscale of the difference image DP with a predetermined threshold value to thereby detect the pattern P0. Subsequently, the area detection section 66 detects the detection areas M from the difference image DP based on the position of the pattern P0 thus detected, and further detects the center position with the highest grayscale in each of the detection areas M of the difference image DP not yet binarized. It should be noted that if the detection areas M can be detected with accuracy, the binarization of the grayscale of the difference image DP can be eliminated.

The projection angle calculation section 67 calculates the relative coordinate of the projection area with respect to the projector 1 based on the center positions of the plurality of detection areas M thus detected. On this occasion, although the projection angle calculation section 67 calculates the relative coordinate using the three detection areas M (e.g., the detection areas M surrounded by the dotted lines in FIG. 3) not located on the same straight line out of the plurality of detection areas M thus detected, the larger the number of the detection areas M used for the relative coordinate calculation is, the more accurate coordination calculation can be performed. Further, the projection angle calculation section 67 calculates the projection angle of the image by the projector 1 based on the relative coordinate thus calculated.

The distance calculation section 68 performs triangulation based on the center positions of the plurality of detection areas M thus detected, and then calculates the distance between the projector 1 and the projection area.

As described above, the projection angle calculation section 67 and the distance calculation section 68 performs the calculation of the relative coordinate and the projection angle, and further the calculation of the distance based on the center position of each of the detection areas M, thus the calculation thereof can be performed with accuracy.

The projection condition adjustment section 69 corresponds to a projection condition adjustment section of the invention, and adjusts the projection condition of the image by the image projection section 2. The projection condition adjustment section 69 is provided with a keystone correction section 691 and a focus adjustment section 692.

The keystone correction section 691 performs the coordinate conversion of the input image generated by the input image generation section 61 based on the coordinate of the projection area and the projection angle thus calculated, and then corrects the input image generated on the frame memory so that the aspect ratio of the image projected on the projection area becomes equal to the aspect ratio of the input image to thereby perform the keystone correction of the projection image.

The focus adjustment section 692 obtains the focus adjustment amount corresponding to the distance thus calculated from the table previously stored in the ROM and having the distance and the focus adjustment amount linked with each other, and then makes the drive section 3 drive the focus lens of the projection optical device 23 to move back and forth. Thus, the focus adjustment of the projection image is performed. It should be noted that it is also possible to calculate the focus adjustment amount by an operation based on the distance.

Projection Condition Adjustment Process

Figure 9:
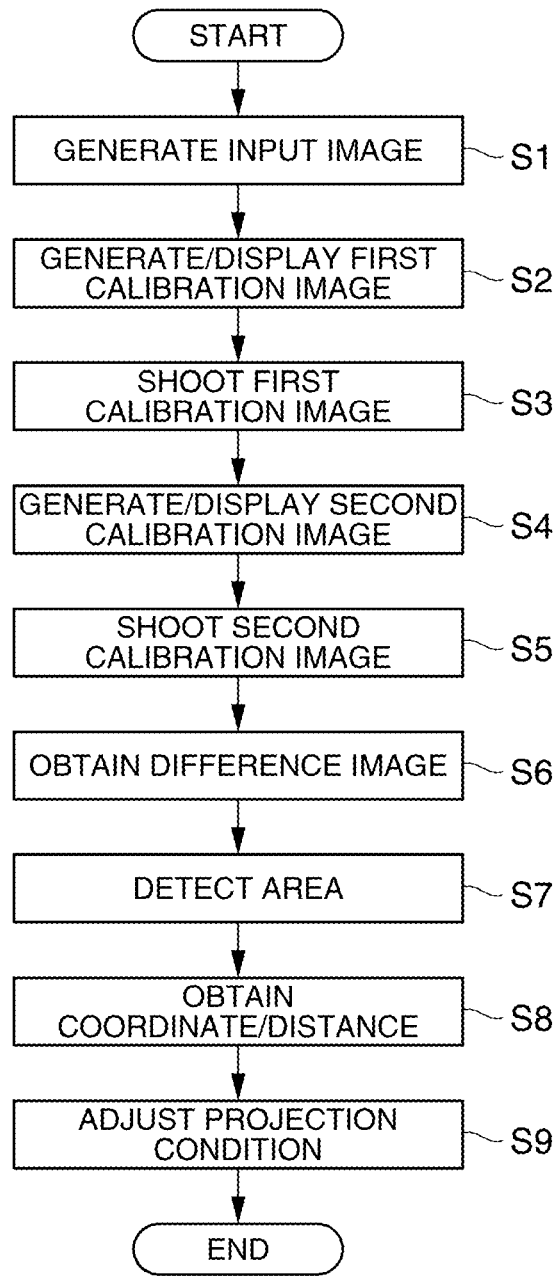
FIG. 9 is a flowchart representing the projection condition adjustment process in the embodiment.

FIG. 9 is a flowchart showing the projection condition adjustment process.

In the case in which the user performs the key input in the operation section 4, the control section 6 described above reads and then processes the projection condition adjustment program to thereby perform the projection condition adjustment process described below.

As shown in FIG. 9, in the projection condition adjustment process, the input image generation section 61 firstly generates (step S1) the input image EP on the frame memory.

Subsequently, the calibration image generation section 62 superimposes the first pattern image PP1 retrieved from the ROM on the input image EP to thereby generate the first calibration image CP1. The first calibration image CP1 is retrieved from the frame memory by the image output section 63, and is then projected and displayed (step S2) on the projection target surface by the image projection section 2.

Then, the shot image obtaining section 64 makes the imaging section 5 shoot the first calibration image CP1 thus projected, and then obtains (step S3) the shot image SP1 of the first calibration image CP1.

Subsequently, the calibration image generation section 62 superimposes the second pattern image PP2 retrieved from the ROM on the input image EP to thereby generate the second calibration image CP2 in a similar manner to the step S2. The second calibration image CP2 is projected and displayed (step S4) by the image projection section 2.

Then, similarly to the case of the step S3, the shot image obtaining section 64 obtains (step S5) the shot image SP2 of the second calibration image CP2 from the imaging section 5.

Subsequently, the difference image obtaining section 65 obtains (step S6) the difference image DP between the shot images SP1, SP2.

Then, the area detection section 66 detects the pattern P0 from the difference image DP thus obtained, and further detects (step S7) the position (the center position) of each of the detection areas M from the pattern P0.

Further, the projection angle calculation section 67 calculates the coordinate of the projection target surface and the projection angle of the image with respect to the projection target surface based on the position of each of the detection areas M thus detected, and then the distance calculation section 68 calculates (step S8) the distance between the projector 1 and the projection target surface based on each of the detection areas M.

Then, the keystone correction section 691 of the projection condition adjustment section 69 corrects the keystone distortion of the projection image based on the coordinate of the projection target surface thus calculated and the projection angle, and further, the focus adjustment section 692 of the projection condition adjustment section 69 performs (step S9) the focus adjustment of the projection image.

According to the process described above, the projection condition adjustment process is terminated, and the image projection with the projection condition adjusted as described above is thereafter performed.

Moving Image as Input Image

Although it is assumed in the above explanation that the input images EP (the input images EP forming the background of the respective pattern images PP1, PP2) on which the first pattern image PP1 and the second pattern image PP2 are respectively superimposed are the same still images, if the image presently displayed is a moving image, the first calibration image CP1 and the second calibration image CP2 are generated by superimposing the respective pattern images PP1, PP2 on the images derived from the moving image. In this case, each of the calibration images is generated by selecting either one of first through third calibration image generation processes described below, or combining two or more of the processes. It should be noted that these processes are performed in the steps S2, S4 described above.

FIGS. 10A through 10H are diagrams showing the calibration images CP1, CP2 generated in the first calibration image generation process. It should be noted that in FIGS. 10A through 10H, 11A through 11H, and 12A through 12H, it is assumed that the input image EP (EP1 through EP8) is updated from A toward H of the respective sets of drawings.

In the first calibration image generation process, the calibration image generation section 62 superimposes the first pattern image PP1 and the second pattern image PP2 on the input image EP as the frame variable with time to thereby generate the first calibration image CP1 and the second calibration image CP2. In this case, the input images EP (the input images EP2 through EP4 in the example shown in FIGS. 10B through 10D) on which the first pattern image PP1 is superimposed are not required to be continuous frames. Similarly, the input images EP (the input images EP5 through EP7 in the example shown in FIGS. 10E through 10G) on which the second pattern image PP2 is superimposed are not required to be continuous frames. It should be noted that since the moving image playback is not halted on this occasion, there are some cases in which the input image EP forming the background of the calibration images CP1, CP2 changes even while displaying the calibration images CP1, CP2.

Also in such a first calibration image generation process, the grayscale of the area corresponding to the line width of the rim B becomes "0" in the difference image DP between the shot images SP1, SP2, and the grayscale varying area (the area corresponding to the central portion C) located between the areas described above is extracted. Therefore, by detecting such a grayscale varying area, the detection area M described above can be detected.

FIGS. 11A through 11H are diagrams showing the calibration images CP1, CP2 generated in the second calibration image generation process.

As shown in FIGS. 11A through 11H, in the second calibration image generation process, the projection condition adjustment process is performed, and when the calibration image generation section 62 displays the first calibration image CP1 and the second calibration image CP2, the playback of the moving image is suspended. In other words, the calibration image generation section 62 superimposes the first pattern image PP1 and the second pattern image PP2 on one of the input images EP (the input image EP2 in the example of FIGS. 11A through 11H) out of the input images EP1 through EP8 as the frames variable with time to thereby generate the respective calibration images CP1, CP2. Therefore, the period shown in FIGS. 11B through 11G corresponds to the state (the state in which the update of the input image EP is not performed) in which the playback of the moving image is suspended. Therefore, as shown in FIGS. 11B through 11D, the background of the first calibration image CP1 displayed becomes the same between the input images EP2, and further, as shown in FIGS. 11E through 11G, the background of the second calibration image CP2 displayed becomes the same between the input images EP2.

According to such a second calibration image generation process, since the input image EP forming the background does not change while displaying each of the calibration images CP1, CP2, the difference image DP between the shot images SP1, SP2 becomes the image obtained by eliminating the background portion as the image component of the input image EP2. Therefore, similarly to the case in which the input image EP is a still image, it becomes easy to extract the pattern P0 corresponding to the central portion C, and it is possible to appropriately and easily detect the detection areas M described above.

FIGS. 12A through 12H are diagrams showing the calibration images CP1, CP2 generated in the third calibration image generation process.

As shown in FIGS. 12A through 12H, in the third calibration image generation process, the frame period of the moving image and the period of displaying the calibration images CP1, CP2 and shooting thereof by the imaging section 5 are synchronized with each other.

In other words, in the present process, the calibration image generation section 62 superimposes the first pattern image PP1 on the input image EP4 corresponding to one frame out of the input images EP (EP1 through EP8) corresponding to the frame variable with time to thereby generate the first calibration image CP1. Then, the shot image obtaining section 64 controls the imaging section 5 to obtain the shot image SP1 of the first calibration image CP1 at the timing at which the first calibration image CP1 is displayed.

Similarly, the calibration image generation section 62 superimposes the second pattern image PP2 on the input image EP5 corresponding to one frame out of the input images EP (EP1 through EP8) to thereby generate the second calibration image CP2. Then, the shot image obtaining section 64 obtains the shot image SP2 of the second calibration image CP2 at the timing at which the second calibration image CP2 is displayed.

According to such a third calibration image generation process, since the calibration images CP1, CP2 can be prevented from being displayed for a long period of time, it is possible to prevent the moving image playback from being hindered, and further, to reduce the difference (difference in background) between the frames remaining in the difference image DP by generating the calibration images CP1, CP2 based respectively on the two input images EP4, EP5 corresponding to the continuous frames. Further, if the shot images SP1, SP2 can be obtained with accuracy, the projection condition adjustment process can be completed in a short period of time compared to the case of adopting the first and second calibration image generation processes.

According to the projector 1 of the present embodiment explained hereinabove, the following advantages can be obtained.

The first calibration image CP1 generated by the calibration image generation section 62 includes the first pattern P1 having the rim B with the grayscale different from that of the central portion C located inside. According to this configuration, it is possible to make it easy to detect the first pattern P1 from the shot image SP1 of the first calibration image CP1 based on the difference in grayscale between the central portion C and the rim B of the first pattern P1. Therefore, the detection accuracy of the detection areas M included in the first pattern P1 can be improved, and the adjustment of the projection condition of the image by the projection condition adjustment section 69 can be performed with accuracy. Further, since it can be made easy for the user to recognize the first pattern P1 in the first calibration image CP1, it can be made easy for the user to figure out that the projection condition adjustment process is in execution.

The difference image obtaining section 65 obtains the difference image DP between the shot image SP1 of the first calibration image CP1 and the shot image of the second calibration image CP2 including the second pattern P2, thereby making it possible to eliminate the image component derived from the input image EP. Further, since the second pattern P2 has the same shape as that of the first pattern P1, and is entirely provided with the same grayscale as that of the rim B of the first pattern P1, the pattern P0 corresponding to the central portion C rimmed with the rims B in the first pattern P1 can be made prominent in the difference image DP. Therefore, the detection areas M included in the first pattern P1 can be made easy to detect, and thus making it possible to further improve the detection accuracy of the detection areas M.

The area detection section 66 detects the position where the grayscale is the highest in each of the detection areas M, thereby making it possible to detect the center position of the detection area M. Therefore, even in the case in which the detection area M is relatively large, the center position of the detection area M can be detected with accuracy, and therefore, the adjustment of the projection condition of the image can be performed with higher accuracy.

Further, since each of the detection areas M is provided with such a grayscale variation, even in the case in which the noise derived from the input image EP and so on is included in the calibration images CP1, CP2 shot by the imaging section 5, it is possible to make it easy to eliminate the noise from the shot images thus obtained using the grayscale variation as an index.

Since the grayscale of the rim B in the detection area M is low while the grayscale of the central portion C is high, the grayscale rises (the brightness increases) as the distance from the center thereof decreases in the detection area M. According to this configuration, even in the case in which the distance between the projector 1 and the projection target surface is large, and the sensitivity of the imaging section 5 is degraded, it is possible to make it easy for the imaging section 5 to appropriately obtain the grayscale variation in the detection area M. Therefore, it is possible to make it easy to perform detection of the center position of the detection area M from the shot image.

Since the keystone correction section 691 corrects the keystone distortion of the projection image based on the coordinate of the projection target surface and the projection angle calculated based on the center position of the detection area M, it is possible to appropriately adjust the projection condition of the image to thereby appropriately display the input image.

Similarly, since the focus adjustment section 692 performs the focus adjustment of the projection image based on the distance thus calculated based on the center position of the detection area M, the focus error can be corrected with accuracy, and thus the input image can appropriately be displayed.

Since the calibration image generation section 62 superimposes the first pattern image PP1 on the input image EP to thereby generate the first calibration image CP1, and superimposes the second pattern image PP2 on the input image EP to thereby generate the second calibration image CP2, both of the first calibration image CP1 and the second calibration image CP2 include the input image EP. According to this configuration, since it is possible to visually recognize with ease that the projection of the image based on the input image EP continues compared to the case of using the calibration image (e.g., an image including a monochromatic background and a monochromatic pattern with a color different from that of the background) not including the input image EP, it is possible to prevent the user from having concerns about whether or not the projection of the image continues.

Modifications of Embodiment

The invention is not limited to the embodiments described above, but includes modifications and improvements in a range where the advantages of the invention can be achieved.

Although in the embodiment described above it is assumed that the first pattern P1 and the second pattern P2 have the 3×3 grid-like shapes respectively composed of the straight lines L1, L2, the invention is not limited thereto. That is, the number of rows and the number of columns can arbitrarily be set, and further, the pattern is not limited to the grid-like shape. Further, the shape of the detection area can also be set arbitrarily.

Figure 13:
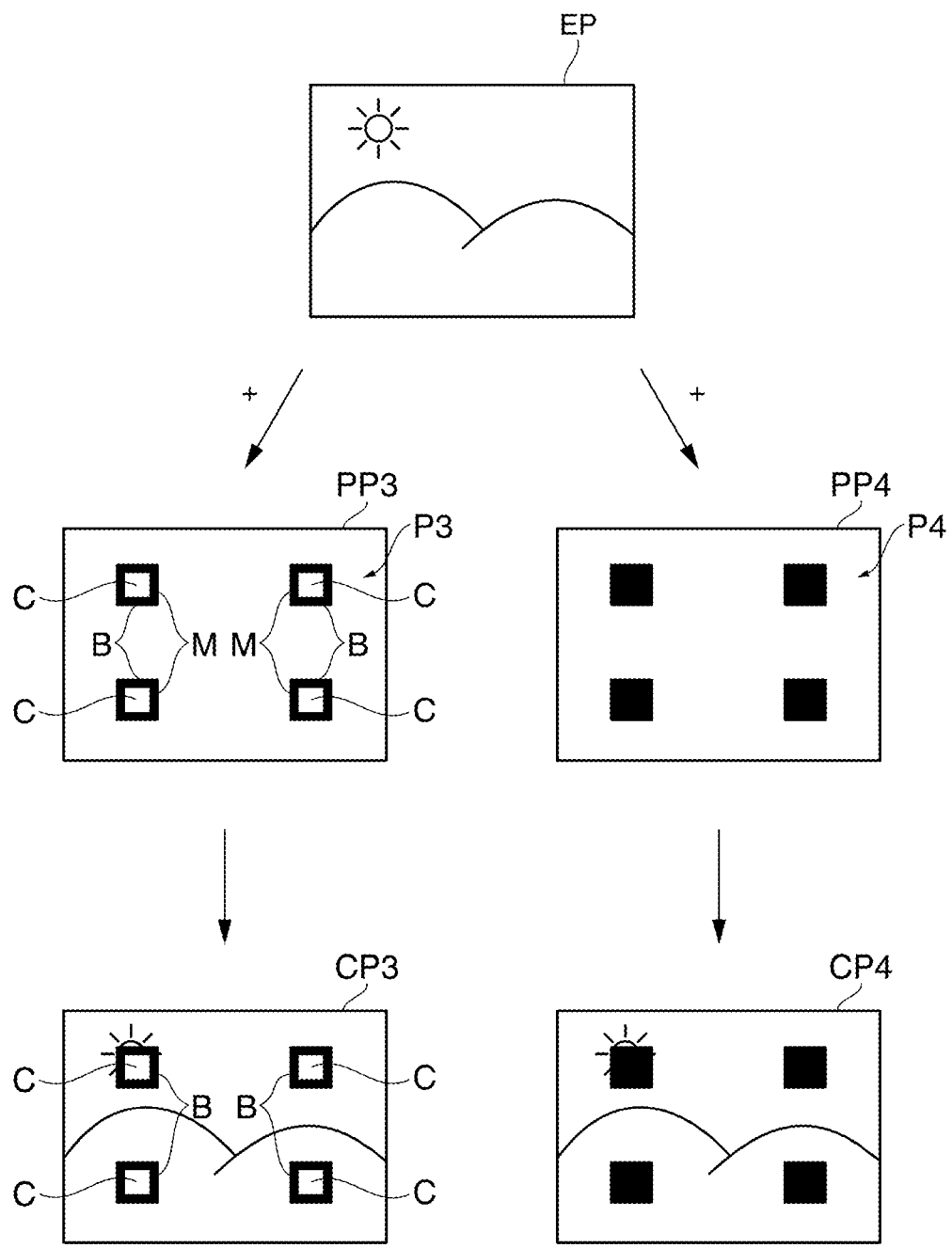
FIG. 13 is a diagram showing a modified example of the embodiment.

FIG. 13 is a diagram showing the generation process of the first calibration image CP3 and the second calibration image CP4 as a modification of the present embodiment.

Specifically, it is also possible to perform the projection condition adjustment process using the first pattern image PP3 including the first pattern P3, which is provided with the rims B having the grayscale different from the grayscale of the inside thereof and is provided with three detection areas M (the four detection areas M in the example shown in the middle stage of FIG. 13) not located on the same straight line as shown in the middle stage of FIG. 13, instead of the first pattern image PP1 including the first pattern P1, and the second pattern image PP4 including the second pattern P4, which has the same shape as that of the first pattern P3, and is entirely provided with the same grayscale as that of the rim B of the detection area M. On this occasion, the calibration image generation section superimposes the first pattern image PP3 on the input image EP to thereby generate the first calibration image CP3, and superimposes the second pattern image PP4 on the input image EP to thereby generate the second calibration image CP4.

Even in the case of using such patterns P3, P4, substantially the same advantage as in the case of the projector 1 described above can be obtained.

Although in the embodiment described above it is assumed that the calibration image generation section 62 superimposes the first pattern image PP1 and the second pattern image PP2 retrieved from the ROM respectively on the input images EP generated on the frame memory to thereby generate the first calibration image CP1 and the second calibration image CP2, the invention is not limited thereto. For example, it is also possible that the first pattern image PP1 previously retrieved from the ROM described above is previously transmitted to the area on the RAM different from the frame memory area in which the input image EP is stored, and then, the image output section 63 outputs the first calibration image CP1 obtained by combining the input image EP and the first pattern image PP1 with each other when the projection condition adjustment process is performed. It should be noted that the second calibration image CP2 can also be generated and then output in substantially the same manner as in the case of the first calibration image CP1. Thus, the generation of the calibration images can promptly be performed.

Although in the present embodiment it is assumed that the calibration image generation section 62 generates the second calibration image CP2 having the second pattern image PP2 including the second pattern P2 superimposed on the input image EP, and then the difference image obtaining section 65 obtains the difference image DP corresponding to the difference between the shot image SP1 of the first calibration image CP1 and the shot image SP2 of the second calibration image CP2, thereby eliminating the image component of the input image EP from the shot images, the invention is not limited thereto. Specifically, if the first pattern P1 (in particular the detection areas M in the first pattern P1) can be detected from the shot image SP1 of the first calibration image CP1, it is also possible to omit the generation of the second calibration image CP2 and the acquisition of the difference image DP. In this case, it is also possible to, for example, firstly detect the rim B of the first pattern P1 from the shot image SP1 of the first calibration image CP1, and then detect the central portion C of the first pattern P1 based on the rim B thus detected, thereby detecting the detection areas M included in the central portion C.

Although in the present embodiment the detection areas M are each set to have the grayscale rising as the distance from the center of the detection area M decreases, the invention is not limited thereto. In other words, the detection area can be set to have the grayscale decreasing as the distance from the center thereof decreases. Further, such a grayscale variation can also be eliminated.

Although in the present embodiment the detection area M is set to have the lowest grayscale of "0" in the rim B, and the highest grayscale of "255" in the center thereof, the invention is not limited thereto. In other words, providing that the difference between the respective grayscales can be detected, it is enough that the grayscale is different between the rim and the central side. Further, the number of grayscale levels of each of the pixels constituting the image is not required to be 256 levels.

Although in the present embodiment it is assumed that the rim B is disposed so as to rim the central portion C of the straight line L1, the invention is not limited thereto. Specifically, the rim B can also be disposed so as to partially rim the central portion C.

Although in the present embodiment it is assumed that the projection condition adjustment section 69 has the keystone correction section 691 for correcting the keystone distortion of the projection image and the focus adjustment section 692 for performing the focus adjustment, the invention is not limited thereto. In other words, it is also possible to arrange that another projection condition is adjusted.

The invention can be applied to a projector.

What is claimed is:

1. A projector adapted to project an image, comprising:
an image projection section adapted to project the image;
an imaging section adapted to shoot the image projected;
an input image generation section adapted to generate an input image based on image information input to the projector;
a first calibration image generation section adapted to generate a first calibration image having a first pattern including a plurality of detection areas superimposed on the input image to thereby make the image projection section project the first calibration image, the first pattern having a first portion and a second portion having a grayscale different from a grayscale of the first portion and rimming the first portion;
a projection condition adjustment section adapted to adjust a projection condition of the image based on the detection areas detected from the first calibration image shot by the imaging section;
a second calibration image generation section adapted to generate a second calibration image having a second pattern, which has substantially the same shape as that of the first pattern, and is disposed at substantially the same position as that of the first pattern, and is entirely provided with the same grayscale as that of the second portion, superimposed on the input image, and make the image projection section project the second calibration image;
a difference image obtaining section adapted to obtain a difference image corresponding to a difference between the first calibration image shot by the imaging section and the second calibration image shot by the imaging section; and
an area detection section adapted to detect the first portion in the detection areas from the difference image,
wherein the projection condition adjustment section adjusts the projection condition of the image based on the first portion detected by the area detection section.

2. The projector according to claim 1, wherein the detection areas are located in the first portion.

3. The projector according to claim 1, wherein
the detection areas each have a grayscale at least either increasing or decreasing as a position moves from the second portion to a center of the detection area.

4. The projector according to claim 3, wherein
the grayscale of the first portion is higher than the grayscale of the second portion.

5. The projector according to claim 1, wherein
the projection condition adjustment section has a keystone correction section adapted to correct a keystone distortion of the image to be projected based on the detection areas detected.

6. The projector according to claim 1, wherein
the projection condition adjustment section has a focus adjustment section adapted to perform focus adjustment of the image to be projected based on the detection areas detected.

7. A projection condition adjustment method performed using a projector adapted to project an image, and adapted to adjust a projection condition of the image, the method comprising:
generating an input image based on image information input to the projector;
generating a first calibration image having a first pattern which is superimposed on the input image, the first pattern has a first portion and a second portion having a grayscale different from that of the first portion and rimming the first portion;
projecting the first calibration image;
shooting the first calibration image projected;
generating a second calibration image having a second pattern which is superimposed on the input image, has substantially the same shape as that of the first pattern, is disposed at substantially the same position as that of the first pattern, and is entirely provided with the same grayscale as that of the second portion;
projecting the second calibration image;
shooting the second calibration image projected;
obtaining a difference image corresponding to a difference between the first calibration image shot and the second calibration image shot;
detecting the first portion from the difference image; and
adjusting the projection condition of the image based on the first portion detected from the difference image.

8. The projection condition adjustment method according to claim 7, wherein
detection areas are located in the first portion.

* * * * *